April 4, 1950 K. K. SHEPARD 2,502,633
WHEEL BALANCER
Filed Feb. 20, 1946 3 Sheets-Sheet 1
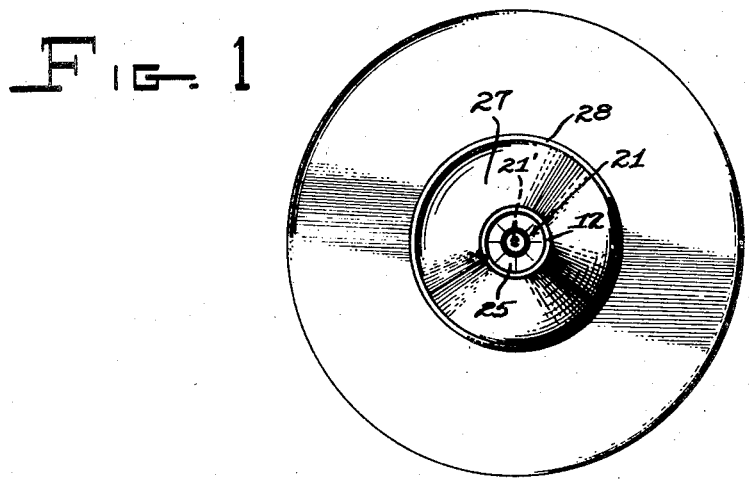
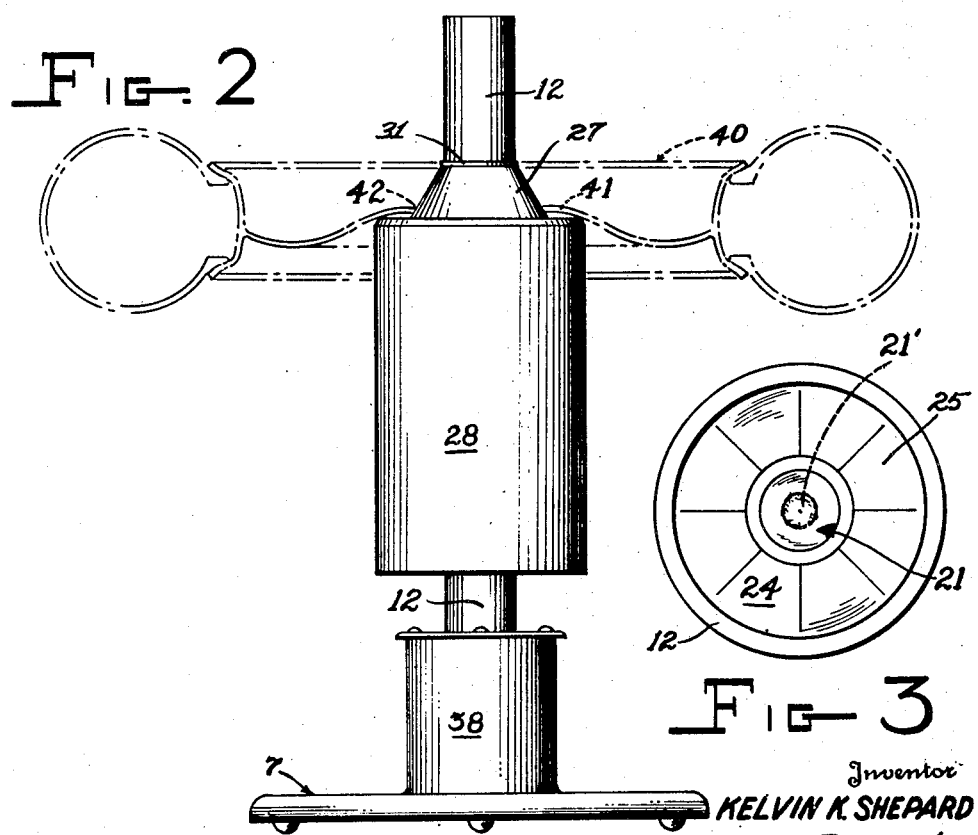
Inventor
KELVIN K. SHEPARD

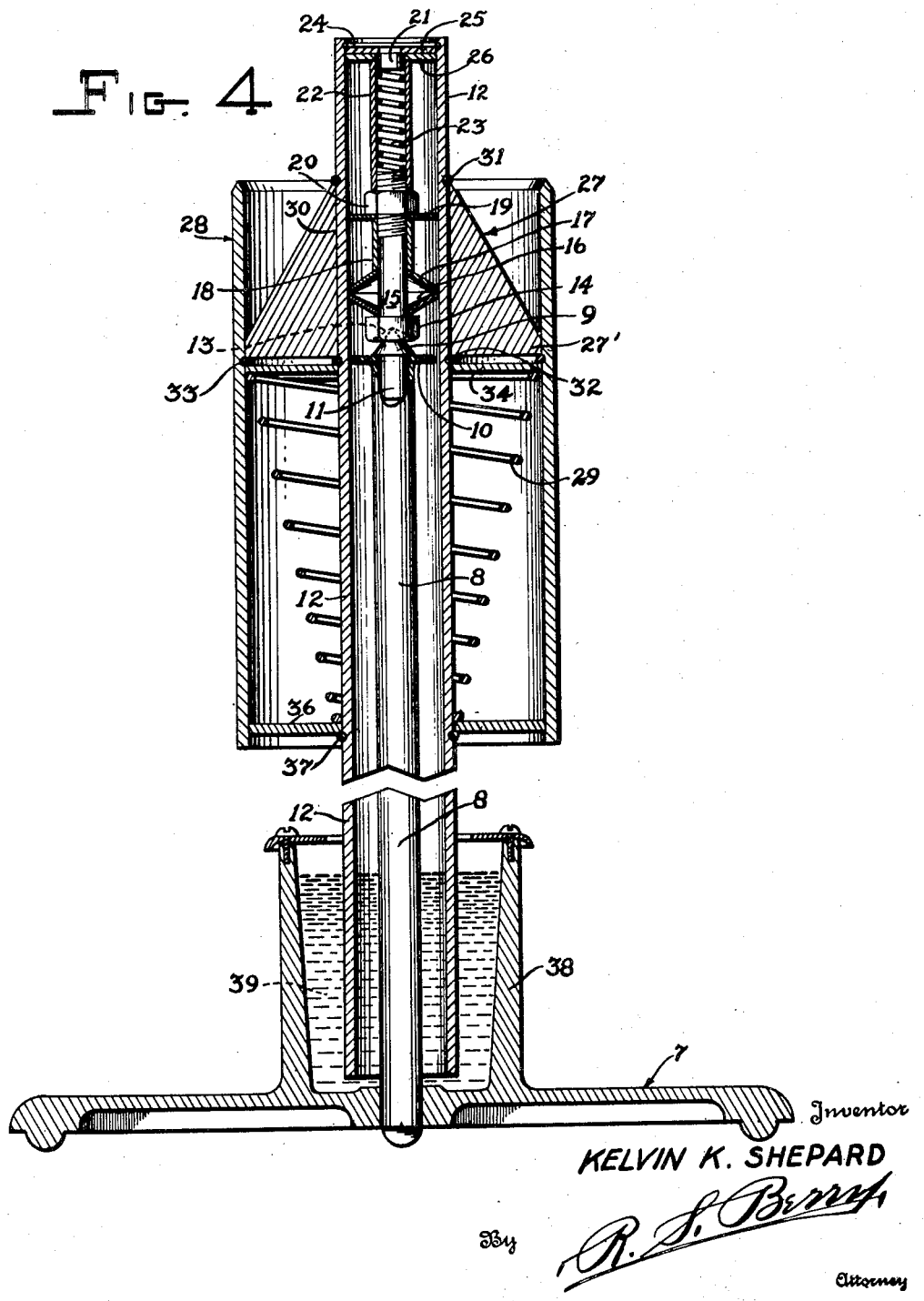

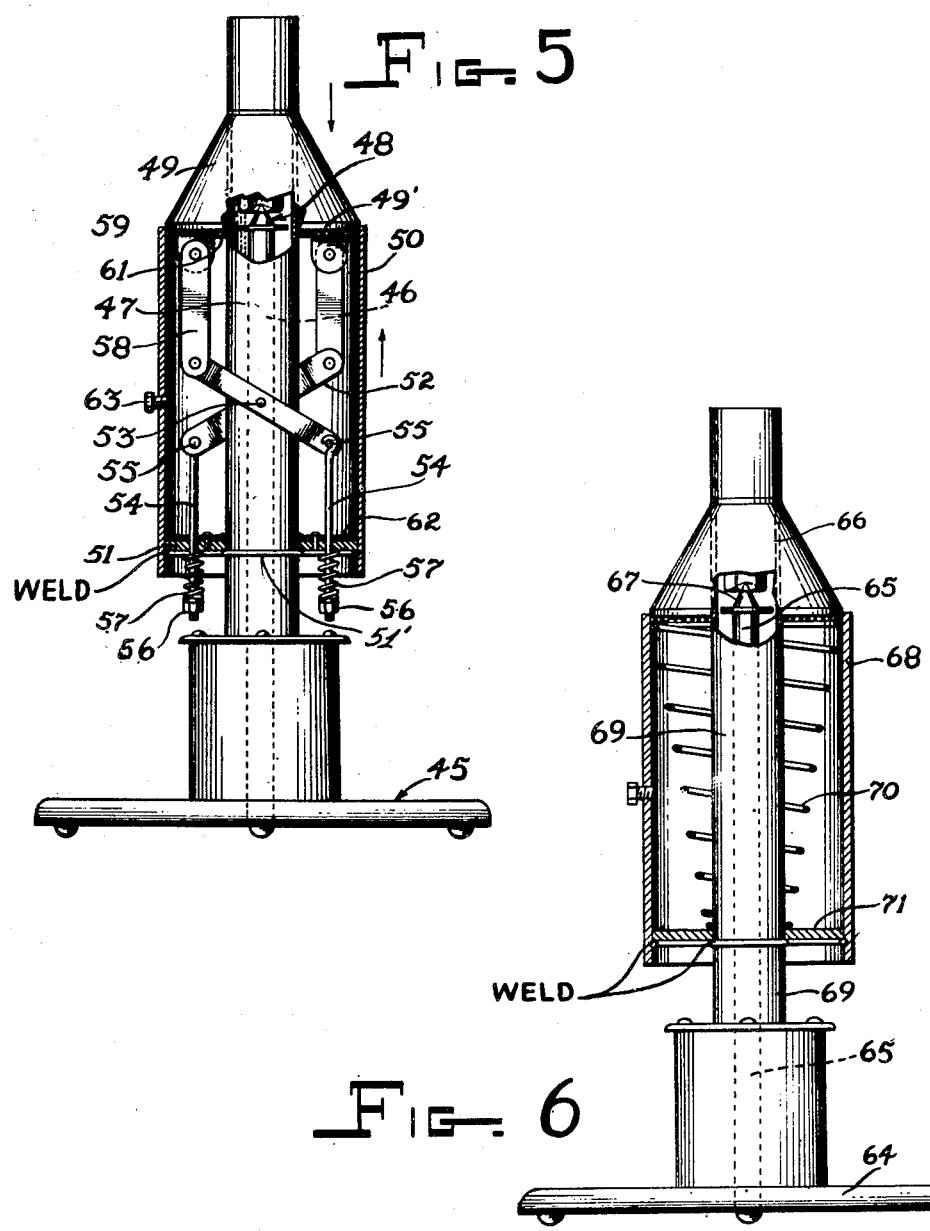

Patented Apr. 4, 1950

2,502,633

UNITED STATES PATENT OFFICE 2,502,633

WHEEL BALANCER

Kelvin K. Shepard, Los Angeles, Calif., assignor of one-half to A. Blair Crist and one-fifth to Ann Shepard, also known as Olga Annette Shepard, both of Los Angeles, Calif.

Application February 20, 1946, Serial No. 648,930

20 Claims. (Cl. 73—66)

This invention relates to devices for testing the balance of wheels, particularly the wheels of automobiles and other vehicles, to locate any unbalanced portions of such wheels so that proper counter-weighting may be resorted to for achieving the desired balance.

One of the objects of this invention is to provide a self-centering wheel balancer of comparatively simple and inexpensive construction which will afford a quick and accurate balance test with a minimum of manipulation upon placing a wheel thereon and without requiring that the operator adjust and center the wheel or clamp it in place.

Another object is to provide in a wheel balancer such as described a combined wheel-centering, wheel-supporting and wheel-leveling means which is of simple and inexpensive construction and entirely automatic in its centering and leveling operation and capable of such actions in connection with wheels of various sizes and shapes.

A further object is to provide in a wheel balancer such as described a novel and highly efficient fulcrum means of simple construction and arrangement and which is protectively enclosed against damage or impairment of any kind and self-centering as well as self-locking when being assembled, to assure that it will be securely held in centered position and at the desired level.

Another object of the invention is to provide in a wheel balancer a novel and efficient wheel-supporting, leveling and centering means which includes two members subject to relative movement under spring resistance and constructed and arranged so that one will act as an automatic wheel centering means and the other as an automatic wheel leveling means and both will maintain the wheel in properly centered and "leveled" position to assure that an accurate balance test may be readily made.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a top plan view of a wheel balancer embodying the present invention;

Fig. 2 is a side elevation of the wheel balancer showing in dotted lines a wheel in centered position thereon;

Fig. 3 is an enlarged top plan view of the level or tilt indicator at the upper end of the device;

Fig. 4 is a vertical sectional view of the balancer;

Fig. 5 is a part side elevational and part sectional view of a modified form of the invention; and Fig. 6 is a part side elevational and part sectional view of another modified form of the invention.

In accordance with my invention there is provided a supporting pedestal which includes a base 7 to which is fixed a vertical column or standard 8 here shown of tubular form and supporting at its upper end a conical fulcrum or bearing member 9 on which a wheel testing unit, to be hereinafter fully described, is rotatably and universally tiltably supported. A washer 10 rests on the upper end of the tubular column 8 as a support for the base of the conical fulcrum member 9 which latter has a shank 11 extending through the washer 10 and press-fitted or otherwise fixed within the bore of said column as shown in Fig. 4.

As here shown (see Fig. 4) a tubular standard 12 surrounds the column 8 and is rotatable and universally tiltably supported thereon by means of the conical fulcrum member 9 having its point seated in the center of a conical depression 13 in the head 14 of a bolt 15 fixed within the bore of said standard at a point spaced well below the upper end thereof. The bolt 15 is fixed and centered by means of two concavo-convex resilient washers 16 and 17 which surround the bolt and have their concave sides opposed to one another. The portions of these washers adjacent their outer edges abut one another while the outer peripheries of said washers have a close fit with the tubular standard 12. The convex side of the lower washer 16 abuts the head 14 of the bolt 15 while the convex side of the washer 17 abuts the lower end of a spacer sleeve 18 surrounding said bolt and abutting at its upper end a washer 19 mounted on the screw threaded end of the bolt and fitting within the standard as a centering means for the upper end of the bolt. A nut 20 is turned on the upper end of the bolt and bears against the washer 19. The assembled bearing unit for the standard 12 (the bolt 15 with the washers 16, 17 and 19 and the sleeve 18 and nut 20 thereon) is subject to being slidably positioned within the standard and is temporarily held therein by the contact of said washers with the standard. Upon tightening the nut 20 with a suitable wrench (not shown) applied before the upper end of the standard is closed, the two concavo-convex washers 16 and 17 are compressed between the sleeve 18 and the head 14 of the bolt and flatten out somewhat so that the peripheries thereof will be forcibly contacted with the standard to lock the bolt in centered position at the desired level. In practice the nut may be tightened to the extent that the peripheries of the washers 16 and 17 will distort the standard and form in effect small grooves (not shown) in which said peripheries are seated.

Inasmuch as the tilting of the standard 12 will indicate the unbalance of the wheel being tested by the device, the upper end of said standard is provided with a spirit level unit 21 which is mounted in the upper end of a tubular member 22 the lower end of which is seated over the exposed end of the bolt 15. The spirit level unit 21 is forced upwardly by a spring 23 mounted in the member 22 with its lower end contacting the upper end of the bolt 15. A snap ring 24 and washers 25 and 26 hold the spirit level unit 21 in place, the washer 26 resting on the adjacent end of the tubular member 22 and surrounding the unit 21 while the washer 25 with a smaller diameter opening, overlies a part of the upper face of the unit 21 to hold said unit in place, and is held against washer 26 by means of the snap ring 24.

A wheel supporting, leveling and centering means is carried by the tiltable standard 12 subject to rotative and tilting movement with said standard whereby the balance of the wheel may be ascertained in accordance with this invention. In general this means includes two relatively movable members one of which levels the wheel while the other centers the wheel and both of which support the wheel and hold it properly positioned to assure an accurate balance test. Relative movement of these members is brought about by the weight of the wheel when initially mounted on one of said members, at which time a spring means associated with said members acts to resist such relative movement and to level the wheel when being centered as well as after the wheel is centered. This spring means also prevents sudden relative movement and slamming of the wheel into centered position and at all times exerts a force which will level the wheel relative to the axes of said members.

As shown in Figs. 1 to 4 inclusive, the means for leveling, centering and supporting a wheel to be tested generally includes a conical wheel-centering member 27 fixed on the standard 12, and a cylindrical wheel-leveling member 28 surrounding the seat member 27 and slidable vertically relative thereto against the action of a spring 29.

The conical member 27 has an axial bore 30 through which the standard extends to provide for fixing the conical member to the standard. Any suitable means may be employed to secure the member 27 to the standard 12 and as here shown this means comprises snap rings 31 and 32 mounted in grooves in the standard and disposed to abut opposite ends of the member 27.

The cylindrical member 28 is yieldably supported by the spring 29 in sliding contact with a cylindrical base portion 27' of the member 27 and with its upper end normally substantially coplanar with the upper end of the member 27. A snap ring 33 carried interiorly of the member 28 contacts the upper side of a washer 34 slidable on the standard and held against the ring 33 by its contact with the upper end of the spring 29. The lower end of spring 29 rests upon a washer 36 held on the standard by means of a snap ring 37 carried by the standard, the member 28 slidably encompassing the washer 36 and being guided thereby as well as by the cylindrical portion 27' of member 27.

As a means for normally stabilizing the tubular tiltable standard 12 the base 7 is formed with a well 38 containing a high viscosity liquid indicated at 39, it being noted that the lower end of the standard extends into the well as shown in Fig. 4. This arrangement provides a dampening action to limit the pendulum effect that would otherwise be present.

Before a wheel, such as the wheel 40 shown in Fig. 2, is placed on the balancer, the latter appears as shown in Fig. 4 with the cylindrical member 28 elevated so that the hub portion 41 of the wheel may be rested thereon with the hub opening 42 over the upper end of the conical member 27. When the operator releases the wheel, it being noted that an exact positioning and centering of the wheel is not required upon initially placing it on the member 28, the weight of the wheel will depress the member 28 and the wheel will settle on the conical member 27 and become automatically centered as the portion of the hub defining the margin of the hub opening 42 comes to rest on the member 27. During this depression of the member 28 it is guided by the cylindrical portion 27' of the member 27 and by the washer 36 and in having uniform contact with the wheel hub at a point around and spaced radially outwardly from the center of the wheel, will maintain the wheel "leveled," that is, the axis of the wheel parallel with the axes of the member 27 and standard 12, whereby an accurate test may be made.

When the wheel is centered on the balancer as shown in Fig. 2, should it be unbalanced, it will tilt so that the heavier portion is downmost and the upper end of the standard will be tilted towards such heavier portion so that the bubble 21' of the spirit level 21 will move toward the elevated side of the level which side is opposite the heavier portion of the wheel, thereby indicating where the wheel may be counterbalanced by application of weights in the usual manner.

It should be noted that while rotation of the wheel is not necessary to test it for balance, the device hereof provides for rotation of the wheel if such is desired while making the test and in either case it is apparent that no exact centering or particular manipulation of the wheel on the part of the operator is necessary in initially placing the wheel on the device or when making the test, inasmuch as the centering operation and the tilting and unbalance indicating operations will be automatic once the wheel is placed on the device in the simple manner hereinbefore stated.

Although the weight of the wheel is primarily supported by the conical member 27 on which the wheel is centered, part of the weight is supported by the circular seat afforded by the upper end of the cylinder 28, and as this cylinder is spring loaded, the wheel is maintained with its axis in exact parallelism to the axes of the conical member 27 and standard 12 regardless of the tilting of said standard, in other words, the wheel is effectively held against tilting relative to the members 27 and 28 on which it rests.

As shown in Fig. 5 a modified form of my invention includes a base 45, a column 46, a tiltable and rotary standard 47, a fulcrum means 48 for the standard, a conical centering member 49, and a cylindrical member 50 which parts are identical with the corresponding parts of the form of the invention shown in Figs. 1 to 4 except that the conical member 49 and the cylindrical member 50 are both movable relative to the standard 47 and relative to each other. The conical member 49 is slidable on the standard 47 and normally projects for the most part above the upper end of the cylindrical member 50 with only its cylindrical base portion 49' within the upper end of the cylindrical member.

Welded within the lower end of the cylindrical member 50 is a washer 51 which is slidable on the standard 47 to guide the member 50 in cooperation with the cylindrical base 49' of member 49. A snap ring 51' acts as a stop for the washer 51 and supports the member 50 and associated parts in the normal position shown in Fig. 5.

The members 49 and 50 are normally held in the relative positions shown in Fig. 5 by means of a spring loaded toggle arrangement including a pair of levers 52 each pivoted between its ends as at 53 on the standard 47. Rods 54 slidably extended through the washer 51 are pivoted as at 55 at their upper ends to certain corresponding ends of the levers 52 and carry axially adjustable nuts 56 on their lower ends. Springs 57 on the lower portions of the rods 54 abut the nuts 56 and the lower side of the washer 51 under compression so that through the rods 54 they exert a pull on the levers 52. The other corresponding ends of the levers 52 are connected by links 58 to ears 59 depending from the member 49. The weight of member 50 is greater than that of the member 49 and therefore exerts a force through the links and levers to normally hold the member 49 elevated as shown in Fig. 5. The springs 57 afford relative movement of the linkage elements to compensate for any irregularities thereof which would tend to cause binding thereof.

The wheel to be tested is placed on the member 49 so that said member projects through the hub opening in the wheel and the weight of the wheel depresses the member 49 which slides downward on the standard 47 against the action of the springs which are then compressed through the rocking of the levers 52. At the same time this rocking of the levers lifts the cylindrical member 50 upwardly until the upper end thereof contacts the hub portion which is around the hub opening. This lifting of the member 50 is effected through the springs 57 so that the member 50 is also yieldingly contacted with the wheel. Thus the weight of the wheel is balanced between the two members 49 and 50 which respectively center the wheel and "level" it relative to such members. The balance test is made with this form of the invention in the same manner as with the form of the invention shown in Figs. 1 to 4.

If desired a dash-pot action may be provided by means of felt or like sealing washers 61 and 62 fixed to the member 49 and washer 51 and sealing the member 50. The member 50 is provided with a valved air vent 63 in which the valve is adjustable to regulate the air escape and the relative movement of the members 49 and 50 best to suit the particular test operation.

As shown in Fig. 6 another modified form of this invention includes a base 64, a column 65, a conical member 66, a fulcrum 67, a cylindrical member 68, and a tiltable and rotatable standard 69 supported on the fulcrum means 67, all identical with the corresponding parts of the first described form of the balancer as shown in Figs. 1 to 4, except that the cylindrical member 68 is fixed to the tiltable standard while the conical member 65 is slidable on the standard. With this arrangement the conical member 66 is normally extended for the most part above the upper end of the cylindrical member 68 by means of a spring 70 the lower end of which rests on a washer 71 welded to the member 68 and to the standard 69 so as to fix the member 68 to the standard. This device may be provided with the same dash-pot elements as shown in Fig. 5 as may also the form of the invention shown in Figs. 1 to 4.

In the use of the balancer shown in Fig. 6, the same procedure is followed with the balancer shown in Fig. 5 as to placement of the wheel. The weight of the wheel will depress the conical member 66 until the hub of the wheel comes to rest on the upper end of the fixed cylindrical member 68 at which time the wheel is centered and leveled as in the other forms hereof. In all other respects this form of the invention is operated in the same manner as the first described form, it being different as to its action, only in that the conical centering member 66 is slidable on the standard 69 while the cylindrical member 68 is fixed to the standard.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a wheel balancer, a pedestal, a tiltable standard telescoping and extending above said pedestal, means supporting said standard on said pedestal for universal tilting movement relative thereto; wheel supporting and centering means supported by said standard including a conical wheel-centering member, a wheel-leveling member surrounding said conical member; means affording relative vertical movement of said members such that responsive to the weight of a wheel, the wheel will become centered and supported on said conical member while also being leveled on said wheel-leveling member; said last named means including spring means for yieldingly resisting relative movement of said members; and an indicator on said standard for indicating the tilting thereof responsive to an unbalance of the wheel under test.

2. In a wheel balancer, a pedestal, a tiltable standard, means supporting said standard on said pedestal for universal tilting movement, a wheel-centering member, a wheel-contacting and leveling member surrounding said centering member, means supporting said members on said standard affording relative vertical movement thereof for centering and leveling a wheel thereon responsive to the weight of the wheel, said last named means including spring means resisting such relative movement.

3. In a wheel balancer, a pedestal, a tiltable standard, means supporting said standard on said pedestal for rotative and universal tilting movement, a wheel-centering member, a wheel-contacting and leveling member surrounding said centering member, means supporting said members on said standard affording relative vertical movement thereof for centering and leveling a wheel thereon responsive to the weight of the wheel, said last named means including spring means resisting such relative movement.

4. In a wheel balancer, a pedestal, a tiltable standard, means supporting said standard on said pedestal for universal tilting movement, a wheel-centering member, a wheel-contacting and leveling member surrounding said centering member, means supporting said members on said standard affording relative vertical movement thereof for centering and leveling a wheel thereon responsive to the weight of the wheel, said last named means including spring means resisting such relative movement, said centering member being conical and fixed to said standard.

5. In a wheel balancer, a pedestal, a tiltable standard, means supporting said standard on said pedestal for universal tilting movement, a wheel-centering member, a wheel-contacting and leveling member surrounding said centering member, means supporting said members on said standard affording relative vertical movement thereof for centering and leveling a wheel thereon responsive to the weight of the wheel, said last named means including spring means resisting such relative movement, said leveling member being cylindrical and fixed to said standard.

6. In a wheel balancer, a pedestal, a tiltable standard, means supporting said standard on said pedestal for universal tilting movement, a wheel-centering member, a wheel-contacting and leveling member surrounding said centering member, and means supporting said members on said standard for relative vertical movement such that one of the members will be lowered responsive to the weight of a wheel placed thereon while the other member will be raised into contact with said wheel, including spring means resisting such relative movement of said members.

7. In a wheel balancer, a pedestal, a standard, means supporting said standard on said pedestal for universal tilting movement relative thereto, a conical wheel-supporting and centering member, a cylindrical wheel-leveling member surrounding said centering member so as to contact a wheel which is centered and supported on said centering member, and supporting means in operative association with said members and said standard affording movement of one of said members responsive to weight of the wheel placed on one of said members whereby the wheel will become centered on said centering member and will come to rest thereon while contacted by said leveling member, including spring means which exerts a force tending to level the wheel on said centering member.

8. In a wheel balancer, a pedestal, a tiltable standard telescoping and extending above said pedestal, means supporting said standard on said pedestal for universal tilting movement relative thereto; wheel supporting and centering means supported by said standard including a conical wheel-centering member, a wheel-leveling member surrounding said conical member; means affording relative vertical movement of said members such that responsive to the weight of a wheel, the wheel will become centered and supported on said conical member while also being leveled by said wheel-leveling member; said last named means including spring means for yieldingly resisting relative movement of said members.

9. In a wheel balancer, a pedestal, a tiltable standard telescoping and extending above said pedestal, means supporting said standard on said pedestal for universal tilting movement relative thereto; wheel supporting and centering means supported by said standard including a conical wheel-centering member, a wheel-leveling member surrounding said conical member; means affording relative vertical movement of said members such that responsive to the weight of a wheel, the wheel will become centered and supported on said conical member while also being leveled by said wheel-leveling member; said last named means including spring means for yieldingly resisting relative movement of said members, a well on said pedestal for containing a viscous fluid into which well the lower end of said tiltable standard is disposed so as to dampen pendulum effects of the standard.

10. In a wheel balancer, a pedestal, a tiltable standard telescoping and extending above said pedestal, means supporting said standard on said pedestal for universal tilting movement relative thereto; wheel supporting and centering means supported by said standard including a conical wheel-centering member, a wheel-leveling member surrounding said conical member; means affording relative vertical movement of said members such that responsive to the weight of a wheel, the wheel will become centered and supported on said conical member while also being leveled by said wheel-leveling member; said last named means including spring means for yieldingly resisting relative movement of said members, said means for supporting said standard for tilting movement including a pair of coacting bearing members within said standard in an arrangement wherein one of the bearing members is fixed on said pedestal and the other to said standard.

11. In a wheel balancer, a pedestal, a tiltable standard, means supporting said standard on said pedestal for universal tilting movement, a wheel-centering member, a wheel-contacting and leveling member surrounding said centering member, and means supporting said members on said standard affording relative vertical movement thereof for centering and leveling a wheel, at least one of said members being movable in response to the weight of a wheel thereon for effecting relative movement between said members.

12. In a wheel balancer, a pedestal, a tiltable standard, means supporting said standard on said pedestal for universal tilting movement, a wheel-centering member, a wheel-contacting and leveling member surrounding said centering member, and means supporting said members on said standard for relative vertical movement, said last named means including means for lowering one of said members in response to the weight of a wheel placed thereon and for raising the other of said members into contact with said wheel.

13. In a wheel balancer, a pedestal, a tiltable standard telescoping and extending above said pedestal, means supporting said standard on said pedestal for universal tilting movement relative thereto; wheel supporting and centering means supported by said standard including a conical wheel-centering member, a wheel-leveling member surrounding said conical member; and means responsive to the weight of a wheel being centered and supported on said conical member for affording relative vertical movement of said members whereby the wheel will also be supported on and leveled by said wheel-leveling member.

14. In a wheel balancer, a pedestal, a standard, means supporting said standard on said pedestal for universal tilting movement relative thereto, a conical wheel-supporting and centering member, a cylindrical wheel-leveling member surrounding said centering member so as to contact a wheel which is centered and supported on said centering member; and supporting means in operative association with said members and said standard, said last named means including means affording movement of one of said members relative to the other of said members in response to the weight of the wheel placed on one of said members whereby the wheel will become centered on said centering member and will come to rest thereon while contacted by said leveling member.

15. In a wheel balancer, a tiltable standard, means supporting said standard for universal tilting movement, a wheel-centering member, a wheel-contacting and leveling member, and means supporting said members on said standard affording relative vertical movement thereof for centering and leveling a wheel, at least one of said members being movable in response to the weight of a wheel thereon for effecting relative movement between said members.

16. In a wheel balancer, the combination of an assembly including a wheel-centering member and a wheel-contacting and leveling member, means supporting the assembly for universal tilting movement, cooperating means on said members affording relative vertical movement therebetween for centering and leveling a wheel, at least one of said members being movable in response to the weight of a wheel thereon for effecting relative movement between said members.

17. In a wheel balancer, the combination of an assembly including a wheel-centering member and a wheel-contacting and leveling member, means supporting the assembly for universal tilting movement, cooperating means on said members affording relative vertical movement therebetween for centering and leveling a wheel in response to the weight of the wheel, whereby the weight of the wheel is partially supported by each of said members.

18. In a wheel balancer, the combination of an assembly including a wheel-centering member and a wheel-contacting and leveling member, means supporting the assembly for universal tilting movement, cooperating means on said members affording relative vertical movement therebetween for centering and leveling a wheel in response to the weight of the wheel, whereby the weight of the wheel is partially supported by each of said members, and resilient means adapted to oppose such relative movement of the members.

19. In a wheel balancer, a pedestal, a tiltable standard, means supporting said standard on said pedestal for universal tilting movement, a wheel centering member, a wheel contacting and leveling member surrounding said centering member and fixed to said standard, and means supporting said wheel centering member on said standard affording vertical movement of said centering member relative to the said leveling member for centering and leveling a wheel, said wheel centering member being movable responsive to the weight of a wheel thereon to effect said vertical movement relative to the said leveling member.

20. In a wheel balancer, a pedestal, a tiltable standard, means supporting said standard on said pedestal for universal tilting movement, a wheel centering member, a wheel contacting and leveling member surrounding said centering member and fixed to said standard, and means supporting said wheel centering member on said standard affording vertical movement of said centering member relative to the said leveling member for centering and leveling a wheel, said wheel centering member being movable responsive to the weight of a wheel thereon to effect said vertical movement relative to the said leveling member, said standard having a part which extends above said centering member when the latter is in wheel centering position, and a device mounted on the said extended part of said standard to indicate tilting thereof if the wheel is unbalanced.

KELVIN K. SHEPARD.

REFERENCES CITED

The following references are of record in the file of this patent:

UNITED STATES PATENTS

| Number | Name | Date |
| --- | --- | --- |
| 1,896,629 | Julian | Feb. 7, 1933 |
| 2,075,421 | Bennett | Mar. 30, 1937 |
| 2,199,667 | Lannen | May 7, 1940 |
| 2,233,371 | Smith | Feb. 25, 1941 |
| 2,298,656 | Smith | Oct. 13, 1942 |

FOREIGN PATENTS

| Number | Country | Date |
| --- | --- | --- |
| 114,195 | Great Britain | Mar. 21, 1918 |